Nov. 22, 1955 S. T. BREWER ET AL 2,724,744

REMOTE LINE CONCENTRATOR

Filed May 6, 1954 4 Sheets-Sheet 1

INVENTORS: S. T. BREWER
W. A. REENSTRA
W. J. RITCHIE

BY [signature]

ATTORNEY

REMOTE LINE CONCENTRATOR

INVENTORS: S. T. BREWER
W. A. REENSTRA
W. J. RITCHIE

BY [signature]

ATTORNEY

Nov. 22, 1955 S. T. BREWER ET AL 2,724,744

REMOTE LINE CONCENTRATOR

Filed May 6, 1954 4 Sheets-Sheet 3

INVENTORS: S. T. BREWER
W. A. REENSTRA
W. J. RITCHIE

BY [signature]

ATTORNEY

INVENTORS: S. T. BREWER
W. A. REENSTRA
W. J. RITCHIE
BY
ATTORNEY

United States Patent Office 2,724,744

Patented Nov. 22, 1955

2,724,744

REMOTE LINE CONCENTRATOR

Sherman T. Brewer, Chatham Township, Morris County, Willard A. Reenstra, Rutherford, and Wesson J. Ritchie, Morris Plains, N. J., assignors to Bell Telephone Laboratories, Incorporated, New York, N. Y., a corporation of New York Application May 6, 1954, Serial No. 427,921

11 Claims. (Cl. 179—18)

Figure 1:
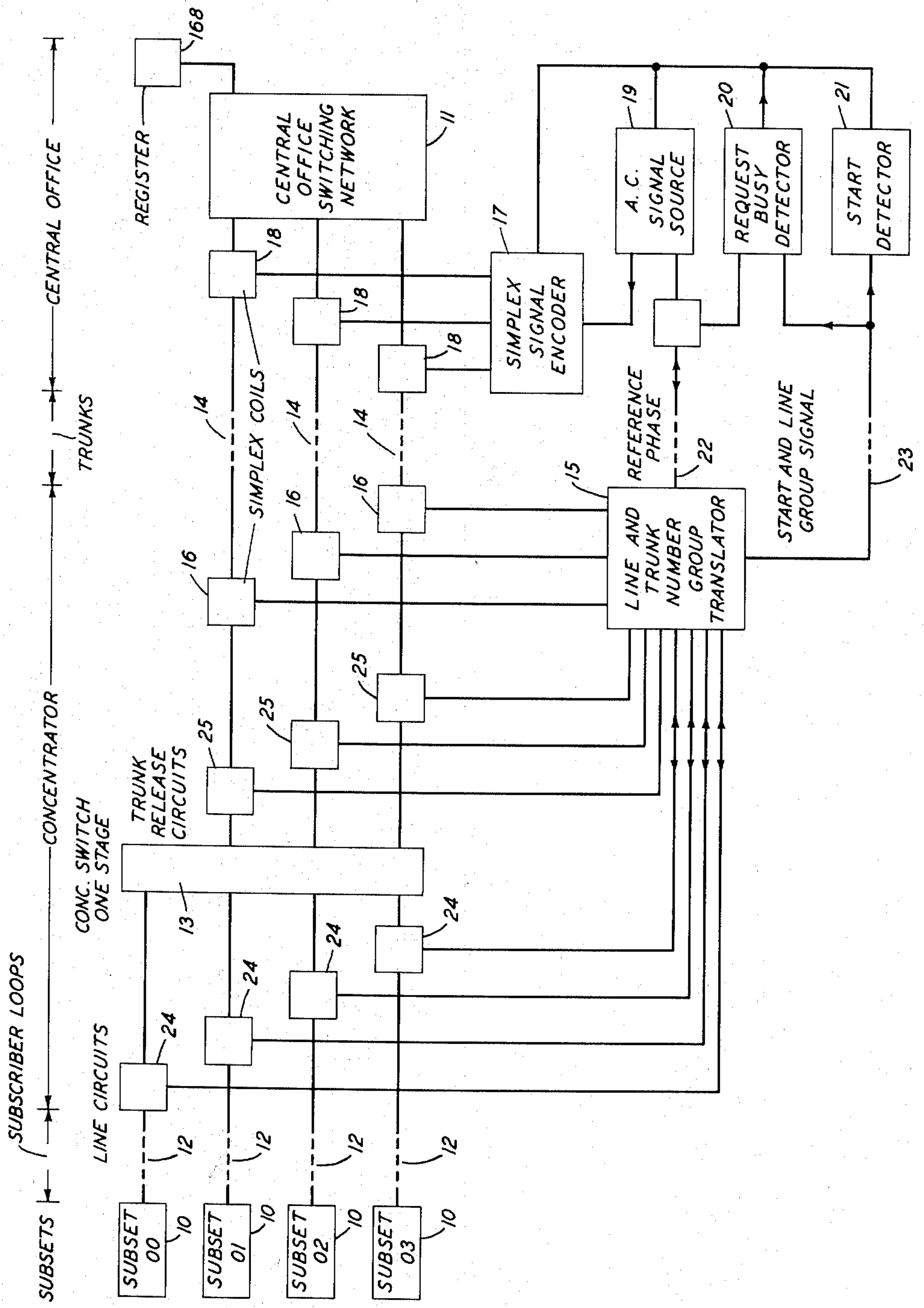

This invention relates to communication systems and more particularly to telephone systems wherein a number of telephone subscribers share a number of common trunks for independent connection to a central office.

Normally, each subscriber requires a pair of line wires to connect his substation with the central office. As the copper used in such subscriber loops constitutes a substantial part of the cost of operation in present-day telephone plants, it is apparent that a communications system wherein a large number of subscriber lines may be connected to a central station by a smaller number of trunks would result in considerable savings.

Such savings can be realized by the interposition of a concentrating switch between the central office and a group of telephone subscribers. This switch, which preferably is located remote from the central office and adjacent the subscribers, advantageously may be comprised of a plurality of crosspoints to define the possible talking paths between the input and output lines.

As the cenrtal office is not directly in information communication with the subscriber lines due to the interposition of the remote line concentrator, it is generally necessary in such systems to provide a number of control leads to effect test and control functions. For example, it is important that the central office be able to ascertain at any time the service condition of any subscriber line, namely, the idle, busy, or service requesting condition of the line, and, further, to supply the control signals to mark particular ones of the subscriber and trunk lines to cause breakdown of the individual crosspoint connected thereto in the remote line concentrator switching network. In order to obtain the greatest saving in the telephone plant it is desirable to have a high ratio between the subscriber and trunk lines connected to a remote line concentrator while keeping the number of control leads required to pass information signals to and from the concentrator to a minimum.

It is a general object of this invention to provide an improved communication system in which a large number of subscriber lines may be individually connected to a central office by a smaller number of common trunk lines whereby considerable saving in copper is attained.

It is a further object of this invention to provide improved circuitry adjacent the subscriber lines and remote from the central station to enable the testing of these lines and the marking thereof with appropriate potentials to effect desired connections of selected lines with selected trunks.

It is another object of this invention to reduce the number of control leads required to supply the remote switch with power and control potentials. More specifically it is an object of this invention to provide a remote switching network wherein the controlling and powering of the contrator require but a few adidtional control trunks or pairs.

These and other objects of the invention are attained in one specific illustrative embodiment comprising a telephone system having a remote line switching network which comprises a plurality of crosspoints that define the possible paths between the central office trunk and subscriber line leads, a number group translator that applies marking potentials to the trunks and individual subscriber lines and tests the service conditions of the lines, and an alternating current simplex circuit that is associated with each trunk to provide a signaling path from a simplex signaling encoder in the central office to the number group translator for the required control and information signals. More particularly, in this specific illustrative embodiment, alternating current coded control and information signals are transmitted to the remote line concentrator from the central office over the existing telephone pairs without interfering with the direct current supervisory signals or the voice transmission of the talking path.

In accordance with one aspect of the invention, the remote line concentrator employs a rectangular switching arrangement having a number of line inputs in one coordinate and a number of trunk inputs in the other coordinate. The crosspoints or intersections of the coordinates are selectively operated by the application of marking potentials to the lines and trunks to connect a particular subscriber line to a particular trunk. The marking potentials are applied by a number group translator located within the concentrator under the control of the central office. The number group translator is a multi-input gate which advantageously comprises a plurality of gas tubes, one for each line and trunk circuit, that are selectively operated by individual alternating current codes transmitted over the simplex circuits.

In this specific illustrative embodiment of the invention, the central office includes a switching network to which the talking trunks are connected, a request-busy detector which receives information from the remote line concentrator indicating the service condition of any of the subscriber lines connected thereto, and a simplex signal encoder by which coded alternating current actuating signals may be transmitted to a number group translator in the concentrator to control the performance of the line testing and marking operations therein.

Testing of the lines is effected by transmitting individual line codes over the simplex circuits to the number group translator. As each code enables its associated translator tube and line circuit, a signal responsive to the service condition of the line is fed back to the central office where the condition is indicated by the request-busy detector which notes the change of current in the line.

While the above general description and the following specific description are directed broadly to a telephone system, it will be understood by those skilled in the art that the invention is also applicable to other types of communication systems, such as the teletypewriter, telegraph, computer and other information processing systems where it may be desirable to enable a large number of remotely located lines and terminals to be individually and selectively connected to a central station over a smaller number of common or concentrator trunks.

It is one feature of this invention that the line and trunk marking signals and the line testing signals be transmitted to and from the central office over an alternating current simplex signaling system. More specifically, it is a feature of this invention that the above information signals be transmitted in the form of predetermined alternating current codes over existing trunks without interfering with the direct current supervisory signals or the voice transmission.

It is a further feature of this invention that the concentrator comprises a number group translator which receives and decodes the alternating current coded signals to control the testing or marking of the subscriber lines and trunks.

It is a still further feature of this invention that the number group translator be reversible, that is, allow passage of information in either direction depending upon the terminating conditions. Thus, it is a feature of this invention that the number group translator can convert coded alternating current information from the central office into line circuit controls and, conversely, can convert line circuit current changes into test information at the central office.

It is a further feature of this invention that the number group translator comprises a plurality of gaseous discharge devices, one for each line, line group, and trunk of the concentrator, which are individually connected to the simplex circuits so as to be selectively operated by the alternating current codes transmitted thereover to control line testing and line and trunk marking operations.

It is a still further feature of this invention that the current through each operated line number gaseous discharge device in the number group translator provides an indication of the service condition of the associated line circuit during the line testing operation.

Figure 2:
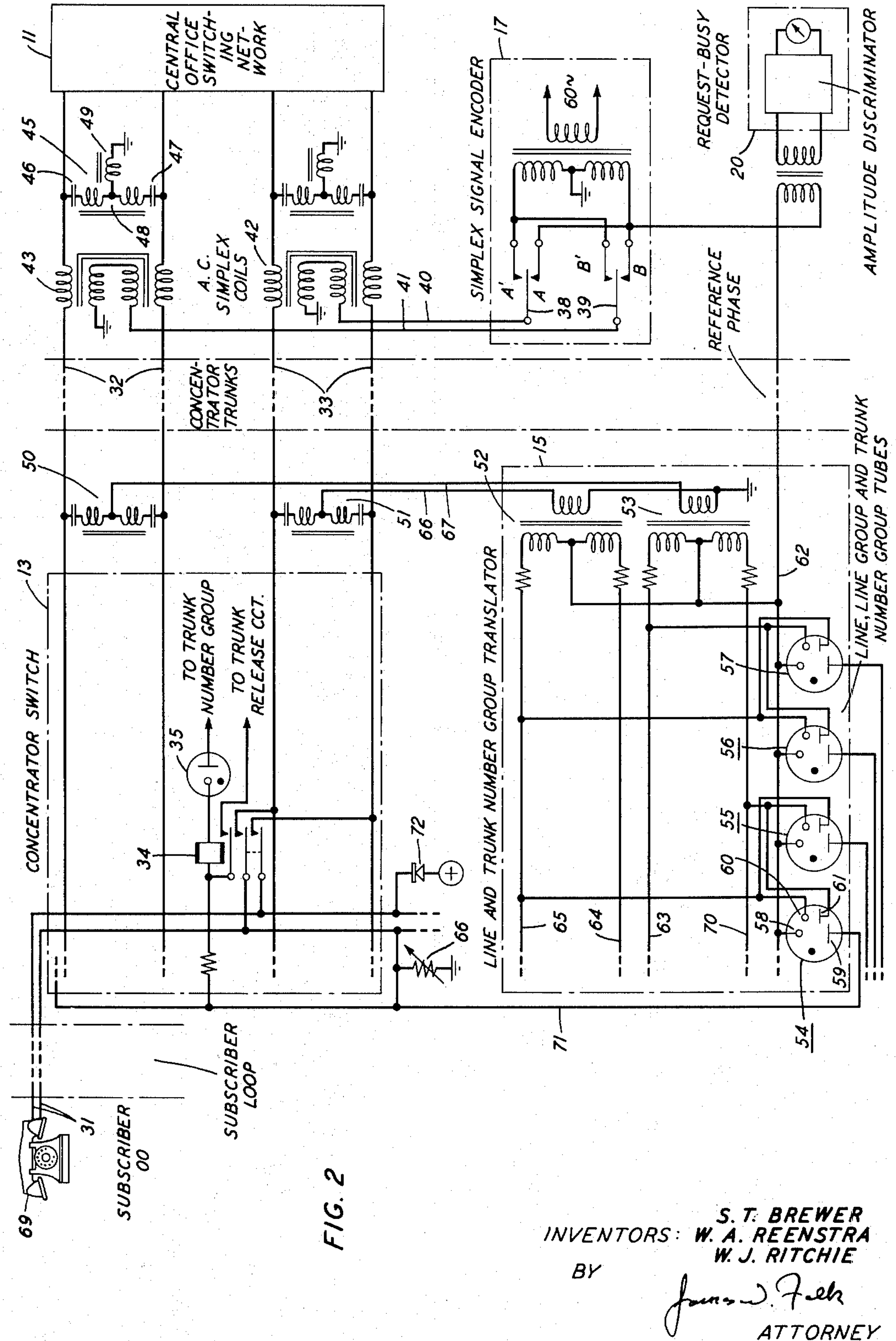
Figure 3:
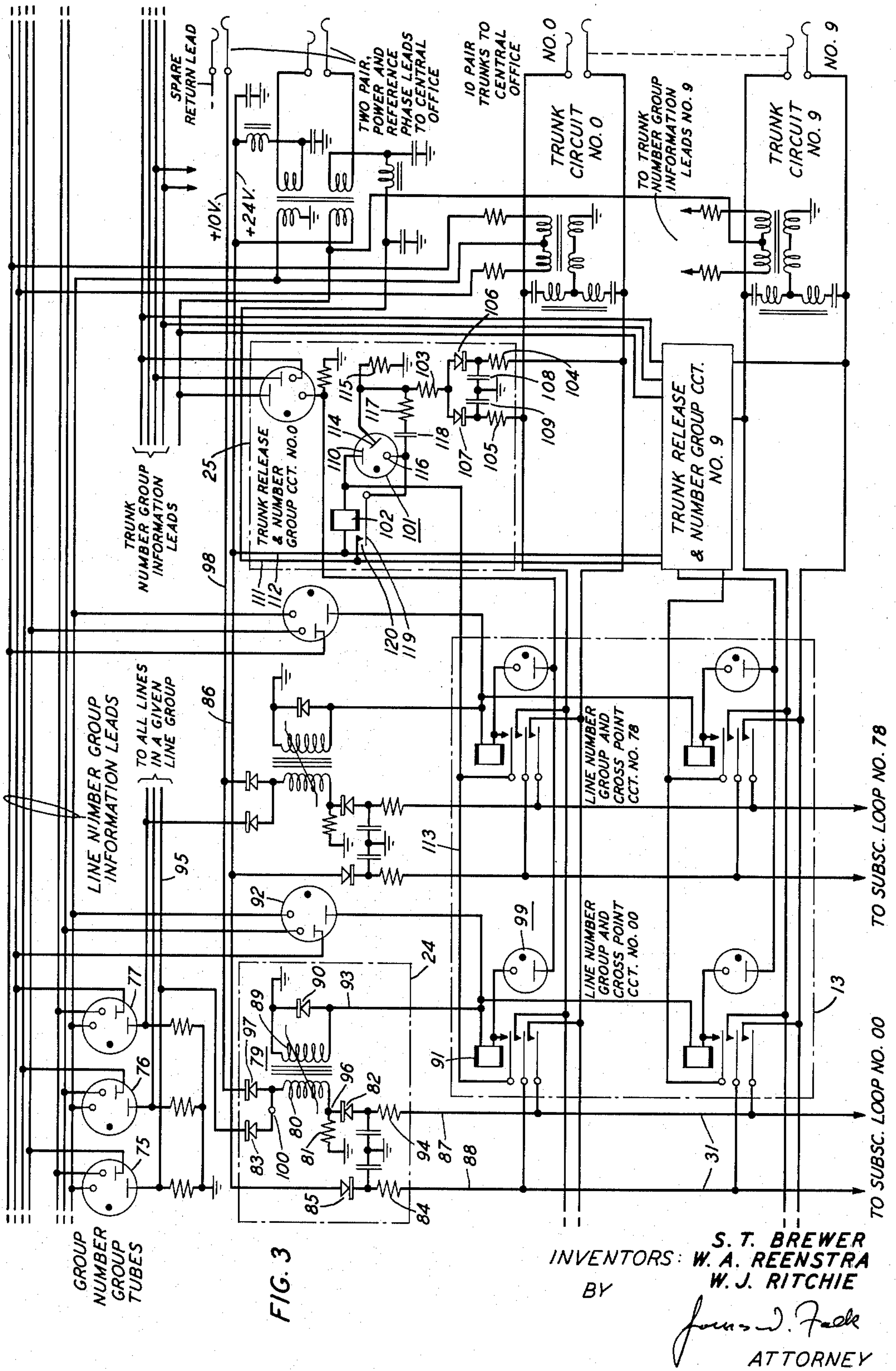
Figure 4:
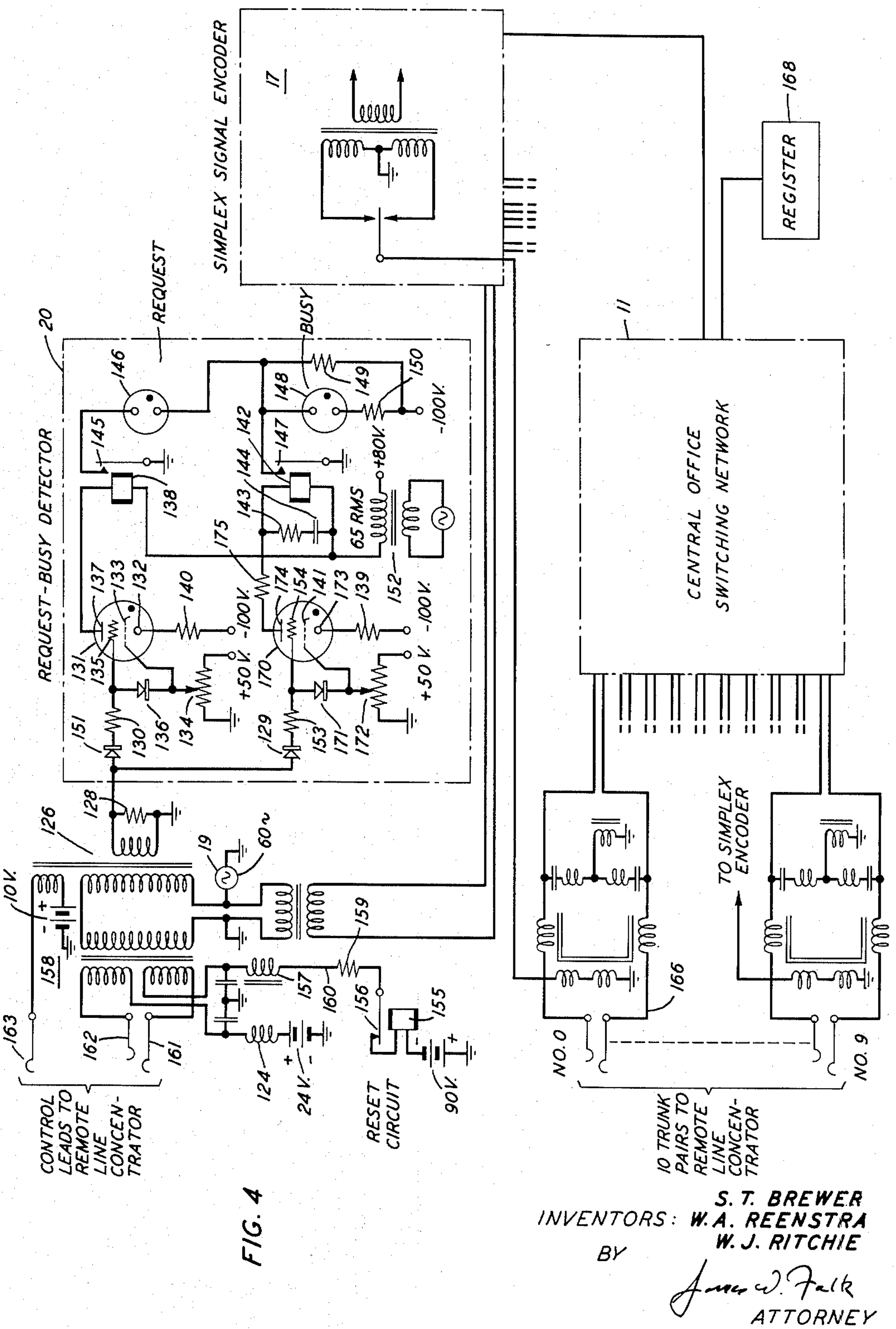

A complete unnderstanding of this invention and of these and various other features thereof may be gained from the following detailed description and the accompanying drawing, in which:

Fig. 1 is a schematic representation, largely in block diagram form, of one specific illustrative embodiment of our invention comprising a telephone system;

Fig. 2 is a simplified schematic representation of the alternating current simplex circuits of the telephone system of Fig. 1, showing particularly a simplex signal encoder and a marking and testing number group translator that may be employed in the combination of the invention, Fig. 3 is a circuit diagram of one specific embodiment of a remote line concentrator in accordance with this invention; and Fig. 4 is a schematic representation of the central office equipment including a request-busy detector in accordance with one specific illustrative embodiment of the invention.

Referring now to the drawing, the specific embodiment of the invention shown in Fig. 1 comprises a telephone system in which a plurality of subscriber handsets 10 have access to a central office switching network 11 through the individual subscriber lines 12, a single stage switching network 13, and a number of common concentrator trunks 14, the number of trunks 14 being less than the number of subscriber lines 12. The line and trunk number group translator 15 is electrically connected to the line side of switching network circuit 13 through the line circuits 24 and to the trunk side through the trunk release circuits 25. The translator 15 is also connected to the common trunks 14 by means of the alternating current simplex coils 16, as described in detail below with reference to Fig. 2. In the central office, the common trunks 14 are connected to a simplex signal encoder 17 by the alternating current simplex coils 18 and to the central office switching network. The simplex signal encoder 17 is connected to an alternating current signal source 19, a request-busy detector 20 and a start detector 21. The line and trunk number group translator 15 is connected to the alternating current signal source 19 and the request-busy detector 20 through the reference phase lead 22 and to the start detector 21 through the start and line group signal lead 23. Before describing specific circuitry and apparatus in accordance with this invention that may be incorporated into this system in particular embodiments thereof, it may be advantageous to describe the general operation of this system with reference to the block diagram representation thereof of Fig. 1.

When a subscriber lifts his handset 10 to originate a call, his line circuit 24 produces a start signal which is sent to the central office over the common start lead 23. In the central office, the start detector 21 receives this signal and causes the simplex signal encoder 17 to generate a train of enabling codes which is applied through the simplex coils 18 to the group of alternating current simplex circuits on the common trunk conductors 14. The subscriber lines 12 are arranged in groups of ten lines each and the first train of alternating current codes examines these line groups in succession. The line group codes are picked off the simplex circuits by the simplex coils 16 at the concentrator and are fed in sequence to the line and trunk number group translator 15. The translator decodes the alternating current signals thus received to test each line group in turn for the presence or absence of a requesting line. When the code of a group containing a requesting line is reached, the line circuit 24, via the number group translator 15 and the line group signal lead 23, sends a request signal to the request-busy detector 20. The request-busy detector then causes the simplex signal encoder 17 to transmit a second train of coded signals over the simplex circuits of the trunks 14. This second train of signals designates the ten individual lines within the previously located line group. At the concentrator these individual line codes are picked off the simplex circuits at the alternating current simplex coils 16 and are fed in sequence to the number group translator 15. The number group translator 15 uses these line codes to enable each of the ten line circuits 24 of the selected group in turn to determine whether or not the condition of any corresponds to a service request. The signals indicating these individual line conditions are fed back from the line circuits 24 to the request-busy detector 20 in the central office over the reference phase lead 22. When the code of the requesting line is reached, this condition is detected by the request-busy detector 20 which stops the simplex signal encoder 17 from transmitting further codes as the task of searching for the requesting line has been accomplished. The controls for the central office switching network 11 then match one of the concentrator trunks 14 with the requesting line. When the appropriate concentrator trunk 14 has been selected, the simplex signal encoder 17 places signal codes on the simplex circuits to designate the line and the trunk to be connected. The line and trunk number group translator 15 decodes these signals and applies voltage marks to the corresponding line and trunk switch terminals connected to the line and trunk release circuits 24 and 25. With these two marks applied, the concentrator switch crosspoint, which may advantageously comprise a two-element gas tube, transistor, or other asymmetric element capable of being broken down on the application of marking potentials thereacross and which is located at the intersection of the designated line vertical and trunk horizontal, is operated to complete the talking path connections. The operated crosspoint is held locked up to a separate battery at the central office for the duration of the conversation.

So that the connection may be supervised and released at the proper time, the trunk release circuits 25 monitor the trunk conductors for the presence of battery fed from the central office. When the latter removes battery there is a short delay for protection and then the release circuit 25 is tripped to shunt down the crosspoint in the concentrator switch and remove the subscriber to trunk connection.

The above explanation is a description of the general operation of a telephone system in accordance with the present invention for an originating call. A terminating call would be similar except that a line busy test would be substituted for the initial line search operation.

Turning now to Fig. 2, there is shown a schematic representation of a portion of the telephone system of Fig. 1, showing particularly the alternating current simplex circuits and the number group translator in accordance with one specific illustrative embodiment of the invention. Complex switching systems are frequently best explained by such a skeletonized presentation, in which the operation of the system is illustrated by a description of the operation of representative components thereof. Thus it will be understood that the lines 31 and the trunks 32 and 33 shown connected to the concentrator switch 13 may represent a large number of such lines and trunks. Similarly, the concentrator switch 13 may comprise a plurality of crosspoints, such as that defined by the gas tube 35 and the electromagnetic relay 34, to connect each subscriber line 31 to any of the trunks 32, 33. In one specific illustrative embodiment of the invention seventy-nine subscriber lines 31 may be selectively connected by the concentrator switch 13 to any one of ten trunks 32, as described below with reference to Fig. 3.

The alternating current simplex and number group translator are the necessary signaling and control circuits between the central office and the concentrator. Each of the concentrator trunks, 32 and 33, is equipped with an alternating current simplex circuit which provides a signaling path from the simplex signal encoder 17 in the central office to the number group translator 15 in the concentrator. When it is activated by the signals transmitted over the simplex circuits from the central office, the number group translator 15 selects the proper line or trunk circuit, distributes a control signal to this circuit, and returns to the central office the response of the selected circuit. As the number group translator 15 can provide such a bilateral flow of information, it may also be referred to as a two-way or reversible number group translator. In the specific illustrative embodiment of the invention described herein, a single two-way number group translator in the concentrator marks both the lines and trunks and tests the lines and line groups.

The signaling or coding system used with the alternating current simplex circuits and number group translator of Fig. 2 advantageously may be one which employs an alternating current *m*-out-of-*n* code. A general coding system of this type is fully disclosed in application Serial No. 398,589, filed December 16, 1953, by Willard A. Reenstra and Wesson J. Ritchie, but will be described briefly here. As used in the specific illustrative embodiment of the invention described herein the alternating current coding system will provide a greater number of available codes with a given number of signaling leads than is possible with binary or direct current *m*-out-of-*n* coding systems. In the latter type of code, a two-condition signal, such as the presence or absence of a direct current voltage, is used. In the alternating current *m*-out-of-*n* codes, however, a three condition signal is used. These may be: no signal, an alternating current signal of reference or zero phase, or an alternating current signal 180 degrees out of phase with the reference phase. This results in a total available number of codes, $$2^m C_n\, m = 2^m \frac{n!}{m!(n-m)!} \qquad (1)$$

where $m$ designates the number of input signal leads used at a time for each output code and $n$ designates the total number of input leads. Thus the number of output codes available by circuits employing the alternating current coding system is equal to the number of combinations of $n$ things taken $m$ at a time, multiplied by a factor of $2^m$. In the concentrator of the illustrative embodiment, two leads are energized at a time making $m=2$; therefore, the alternating current coding produces four times the number of codes possible with the usual *m*-out-of-*n* direct current coding system. This, of course, makes possible the use of relatively fewer circuits for a given amount of information.

The alternating current simplex circuits, as shown in Fig. 2, consists of the components necessary to place the proper information and control signals on the concentrator trunks at the central office and on the receiver at the remote line concentrator. The alternating current signals from the movable contacts 38 and 39 of the simplex signal encoder 17 are transmitted by leads 40 and 41, respectively, to the inner windings of the simplex transformers 42 and 43. The outer windings of these transformers are in series with the concentrator trunks 32 and 33 and are poled to produce longitudinal voltages of about 30 volts of the 60 cycle signal on the trunks. The central office end of each transformer is connected to an inductance-capacitance filter network 45, composed of inductors 48 and 49 and capacitors 46 and 47. This filter presents a high impedance to balanced signals but effectively grounds longitudinal signals. The inductor 48 provides a high impedance path between the two conductors of the trunk 32 for balanced signals such as speech, while the capacitors 46 and 47, the inductor 49, and the leakage inductance of the inductor 48 are series resonant and provide a low impedance from the line conductors to ground for longitudinal signals. At the concentrator end of the trunks 32 and 33, other inductance-capacitance filters 50 and 51, are used to receive the alternating current simplex signals. The operation of the latter filters is the same as the ones at the central office end described above with the transformers 52 and 53 each taking the place of the inductor 49. Each of the transformers 52 and 53 delivers about 60 volts peak each side of the center tap to operate the tubes of the number group translator 15.

The number group translator contains one tetrode gas tube, which advantageously may be of the Western Electric 425A type, for each line, line group and trunk circuit of the concentrator. As shown in simplified form in Fig. 2, the translator comprises the gas tubes 54, 55, 56 and 57, each having a main cathode 58, a main anode 59, a starter cathode 60 and a starter anode 61. All of these tubes have their main cathodes 58 connected in common to the combination power information lead 62, hereinafter referred to as the reference phase lead. The starter cathodes and anodes of each of these tubes are connected to various ones of the simplex circuit leads in paired combinations, there being a unique combination of said leads for each tube. As the coded alternating current signals are received by the translator 15 over the simplex circuits the simplex leads are energized such that each code will cause one and only one of the tubes to operate. The main anodes of the number group translator tubes are connected to respective ones of the line, line group and trunk circuits to apply marking and testing potentials thereto upon tube operation. For example, the main anode of tetrode 54 is connected to the line circuit of subset 00 and to the crosspoint relay 34 in the concentrator switch network. Similarly the main anodes of the remaining tubes in the translator 15 are each connected to their respective line circuits, line group circuits and trunk circuits.

The translator tubes are individually and selectively operated by the following codes from the simplex signal encoder:

| Encoder setting: | Tube operated |
|---|---|
| A+B | 54 |
| A′+B′ | 55 |
| A+B′ | 56 |
| A′+B | 57 |

For example, assume we wish to fire tube 54 to mark or test the line of subset 00. From the above chart it will be seen that the code for this tube is *A+B*. As the unprimed letters refer to voltages in phase with the reference phase and the primed letters to voltages out of phase with same, the code shows us that to fire tube 54 we must have the movable contacts 38 and 39 of the encoder 36 connected to the stationary contacts A and B, respectively. This places voltage on trunks 32 and 33 in phase with the reference phase. Also assume that the reference phase voltage is in the negative half cycle at this time. As the voltages on the concentrator trunks are in phase, the voltages on the simplex circuit leads 66 and 67 will also be in phase. Similarly in the number group translator the voltage on lead 65 will be in phase with that on lead 63, and the voltage on lead 64 will be in phase with that on lead 70. Tubes 56 and 57 cannot fire under these conditions as the starter electrodes of each are connected to in-phase leads resulting in zero voltage across these electrodes. However, across the starter electrodes of tubes 54 and 55 there is a 120 volt peak which is sufficient to cause breakdown of these tubes. As the direction of the voltage across one of these tubes is in the inverse of the direction of the voltage across the other, only the one having voltage in the forward direction, in this assumed example tube 54, will fire and lock out the other tube. The discharge in the starter circuit of tube 54 will transfer to the main gap, in accordance with the operating characteristics of gas tetrodes and the main gap continues to conduct for the rest of the half cycle. On the next, or positive half cycle of the reference phase voltage the starter gap of tube 55 fires, but the discharge will not transfer to the main gap because the main gap polarity is reversed. The remaining tubes 55, 56 and 57, of the number group translator are selected by their individual codes in a similar manner, with the selected tube firing on the negative half cycle of the reference phase voltage.

Thus far we have described the selection of the number group translator tubes by the codes transmitted from the simplex signal encoder in the central office over the alternating current simplex circuits. Now we will describe the number group translator action after the selected tube has fired. To mark or test a line, say circuit 00, the tube connected to this circuit, tube 54, is fired at a time when the alternating current voltage on the reference phase lead 62 is negative. The main anode of tube 54 is connected by lead 71 to the line side of the crosspoint relays 34, there being one relay for each concentrator trunk and to the line circuit of subset 00, which includes the subset 69, the subscriber loop 31, a variable impedance 66 and a source of positive potential connected to the line circuit by a rectifier 72. One particular line circuit that may advantageously be employed in our novel telephone system in accordance with our invention is disclosed in application Serial No. 427,965, filed May 6, 1954, by W. A. Reenstra, and is also described subsequently herein with reference to Fig. 3. For our present purposes, consider the variable impedance 66, represented schematically as a variable resistance in Fig. 2, as a reactance network, the impedance of which is determined by the service condition of the line. As shown in Fig. 2, the reference phase lead 62, the number group translator tube 54, and the line circuit impedance 66 are in series. The 120 volts peak present on the reference phase lead therefore divides between the tube and the line circuit. Tube 54 has a sustain or drop voltage between the main anode and main cathode of 70±10 volts; the resultant voltage on the line circuit is a −50±10 volt mark. As described in greater detail below, the impedance of the line circuit will be distinct for the idle condition, busy condition, and service requesting condition of the line, and accordingly there will be a corresponding change in the current drawn by the line circuit from the reference phase circuit in the central office for each of these conditions. In this way the condition of the line being tested can be determined by knowing the line number group tube being operated and the amplitude of the current pulse drawn from the reference phase circuit. Thus the current drawn from the anode circuit of tube 54 by the reference phase lead 62 indicates the impedance of line circuit 00 and is used to inform the request-busy detector of the line condition.

Testing of the line circuit by operating the associated line number group tube produces a pulse or line mark of approximately 50 volts at the line side of all of the crosspoints associated with the operated tube. If another mark is applied to the trunk side of the switch, a crosspoint diode 35 would fire and a current would be produced to operate the associated crosspoint relay 34. These trunk marks are applied to the trunk side of the concentrator switch 13 in much the same manner as the line marks described above. There are a plurality of trunk number group tubes in the line and trunk number group translator 15, one for each concentrator trunk, which are selectively fired by individual alternating current coded signals transmitted from the simplex signal encoder 17 in the central office over the alternating current simplex circuits.

Thus it is now clear that the novel two-way number group translator 15 can be made to operate under the control of the central office to perform busy-request tests on the subscriber lines connected to the concentrator and report indications thereof back to the central office as well as connect selected lines to selected trunks by applying marking potentials thereto.

Fig. 3 shows a circuit arrangement of a specific embodiment of a ten-trunk remote line concentrator having seventy-nine subscriber lines connected thereto. The line circuits and trunk release circuits are shown in detail and will now be described in relation to the other components of the figure.

As pointed out in the general description of the operation of the instant telephone system above, when a start signal is received by the central office, the subscribers' lines are individually scanned by the simplex circuits to identify the requesting line. In systems having a large number of such lines connected thereto such a scanning process could require considerable time before the proper line is reached. To reduce the time required for testing the concentrator lines for service requests, a two step hunting process is used in accordance with a feature of the present invention. The lines are divided into groups, which advantageously may be sixteen lines each, and in the first step the groups are tested to determine the one containing the requesting line. For this purpose, a bank of group number group tubes, such as 75, 76 and 77, operated in the same manner as the line number group tubes described heretofore, is provided. Each group number group tube is connected to the line circuits of its associated sixteen lines. Referring to Fig. 3, the main anode of group number group tube 75 is shown connected through a diode 83 to the control winding 80 of a saturable core reactor 79. The other end of the winding 80 is connected through a resistor 81 to ground, and through a diode 82 and a resistor 94 to one conductor 87 of the subscriber loop number 00. The other conductor 88 of subscriber loop number 78 is connected through a resistor 84 and a diode 85 to a lead 86 which is common to all of the subscriber loops and returns to a source of potential in the central office. The other winding 89 of the saturable core reactor 79 has a diode 90 connected thereacross and is connected at one end to ground. At the other end, the winding 89 is connected by lead 93 to the crosspoint relay 91 and all of the other crosspoint relays, one for each trunk, of the same vertical appearance. Lead 93 also connects winding 89 to the main anode of the line number group tube 92. Group number group tube 75 is connected by lead 95 to the line circuits of the remaining lines of the group in a similar fashion.

As previously pointed out, the impedance of each line circuit varies in accordance with the service condition of the subscriber's line. These line service conditions may be classified into three types—the idle condition, in which there is no connection through the concentrator switch and where the subset is in the "on-hook" condition, a busy line, in which there is a connection through the concentrator switch to the central office, and the service request condition, in which the subset is in the "off-hook" condition and is not connected through the concentrator to the central office. These conditions may be tabulated as follows:

*Table I*

| | Condition | Subset | Line to Trunk Crosspoint |
|---|---|---|---|
| 1 | Idle line | On-Hook | Not Operated. |
| 2 | Busy line | On-Hook or Off-Hook | Operated. |
| 3 | Service Requesting Line. | Off-Hook | Not Operated. |

In the idle and service request line conditions, there is no connection through the concentrator, so in either case, none of the crosspoints of the line to be tested is operated. Hence, the distinction between an idle and a requesting line must be made on the basis of the state of the switchhook at the subscriber's instrument. In the off-hook or service requesting position the resistance across the subscriber's loop is low, approximately 62 ohms plus the loop resistance. With the receiver in the on-hook or idle position this resistance is high. Under this condition the only current path is that due to line leakage which has a lower limit of 10,000 ohms. By using the loop resistance as a series element in a voltage divider comprised of resistor 81, diode 82, resistor 94, the loop resistance, resistor 84, and diode 85, point 96 of loop number 00 will take on the following voltage values with respect to ground for various subset conditions:

*Table II*

| | Line Condition | Max. (10,000 Ohms Line Leak Case) | Min. |
|---|---|---|---|
| | | *Volts* | |
| 1 | Idle | 9.6 | 0. |
| 2 | Service Requesting | 12 | 11.8 volts (assuming 600 ohm loops). |

With the above values for the voltage at point 96 of Fig. 3 and a positive 10 volt bias on the diode 97 no current will normally flow through the control winding 80 of the saturable reactor 79 when line number 00 is idle. The impedance in the anode of the line number group tube 92 is then the back impedance of the diode 90 in parallel with the high impedance of the saturable coil winding. In the off-hook or service requesting condition, the diode 97 is no longer back biased and the current which then flows through the control winding 80, diode 97, and lead 98 is detected at the central office as a signal to start hunting for the requesting line. This current is also sufficient to saturate the core of reactor 79. As a result, the impedance presented to the line number group tube 92 is lower and more current will be drawn from the reference phase supply at the central office when tube 92 is triggered to identify line number 00 as the requesting line.

The remaining condition to be detected is that of a busy line. This condition differs from the two discussed above in that a crosspoint is operated from the line to a trunk. The holding current for the crosspoint relay 91 normally flows from ground through the diode 90 in the saturable reactor circuit. This current is diverted through the number group tube 92 when the latter conducts to produce a current change in the reference phase circuit. When the line is in the busy condition this current change is larger than that produced by either of the other two conditions. The variations in current change among the three possible conditions form the basis of the identification of the condition of the concerned line by the request busy detector in the central office. During the busy condition the talking battery, which is placed on a conductor of the subscriber's loop, back biases the diode 82 which connects to point 96 so that the subscriber's loop produces no current in the control winding of the saturable coil. This causes the impedance of the coil to be high, restoring it to the idle line condition while the line is busy, thereby removing the off-hook request indication from the 10 bolt bias lead 98.

To identify the group containing the line requesting service in the hunting process, each group number group tube 75, 76, etc., is fired in turn. A pulse from the operated group number group tube, say tube 75, drives points 100 of all lines in the group negative. This negative pulse drives diode 97 of the requesting line circuit into its back or non-conducting state, thus reducing the current in the positive 10 volt bias lead 98. The request busy detector in the central office has its input transformer 158 coupled through lead 163, as seen in Fig. 4, to the bias lead 98 and hence receives a triggering signal when and only when the group number group tube of the group containing the requesting line is operated. The use of a group testing method such as this for a concentrator of fifty lines, for example, in which five groups of ten lines each are used, reduces the maximum required testing time from fifty to fifteen test intervals.

The above explanation shows how the subscriber loop impedance in series with the number group anode is changed with the conditions of the subscriber's line and the crosspoint. This is first used to isolate the group in which the requesting line is located, and as the second part of the hunting process, to identify the requesting line in the chosen group.

Another feature of our novel remote line concentrator is the employment of a release circuit in combination with each trunk to supervise and release the connection. One particular release circuit that may be used advantageously in our telephone system in accordance with the present invention is disclosed in application Serial No. 428,031, filed May 6, 1954, by S. T. Brewer and will now be described with reference to Fig. 3. This circuit monitors the conductors of the concentrator trunk for battery voltage fed over the trunk pairs from the central office. Under the busy condition, which includes talking, ringing, and dialing, either the tip or the ring lead of the concentrator trunk has a negative potential thereon and the connection is held. However, under the release condition all central office battery is removed from the concentrator trunk and the release circuit acts to shunt down and open the connection after a short delay. This delay is designed to prevent a false release of a busy connection when central office battery is removed for a short time due to ringing cutoff or transfer between silent and ringing intervals of the ringing signal.

Referring now to Fig. 3, each release circuit comprises a release tube 101, which advantageously may be of the Western Electric 395A type, a trunk busy relay 102, a reset relay 155, which is located in the central office and shown in Fig. 4 and is connected to the concentrator by lead 111 and the concentrator trunk leads, and a release circuit filter which consists of resistors 103, 104 and 105, diodes 106 and 107, and condensers 108 and 109. These elements occur on a per trunk basis with the exception that there is only one reset relay per concentrator. The release tube 101 is the main element of the circuit as it acts as both the marginal detector for supervision and the shunt down path for the crosspoint. The main anode 110 of the release tube 101 is connected to a source of positive potential through the trunk busy relay 102 and the lead 112. Anode 110 is also connected to the relay contacts of its associated crosspoints by lead 113. The start anode 114 of tube 101 is connected to ground through resistor 115, to the filter circuit through resistor 103, and to the release tube cathode 116 through a resistor 117 and a condenser 118. The release tube cathode 116 is connected through the contacts of the trunk busy relay 102 and lead 111 to the reset relay in the central office. One lead of the concentrator trunk is connected to the release circuit resistor 103 by the series combination of resistor 105 and diode 107, while the other lead of the trunk is connected to resistor 103 by the series combination of resistor 104 and diode 106. The midpoints of each of the above series combinations are connected to ground through condensers 109 and 108, respectively.

The release circuit filter performs two functions. First, through the diodes 106 and 107, the more negative of the two trunk conductors is connected to the release tube 101, and second, the filter prevents false releasing of the connection by ringing voltage, the alternating current simplex voltage, or short period removals of the battery in the central office. The trunk busy relay 102 also functions to supply main cathode voltage to the release tube 101 only when the trunk is busy. This prevents constant triggering of the release tube 101 when the trunk is idle. The reset relay in the central office functions to reset or put out the release tube after the shunt down interval.

The series of events between connection and disconnection will now be described. First, the crosspoint 99 is operated by the application of line and trunk marks to the switch. After the line and trunk marks are removed the crosspoint relay 91 is held operated by the positive 24 volt potential supplied through the lead 112, the trunk busy relay 102, the lead 113 and the hold contacts of the crosspoint relay, the circuit being completed to ground through the diode 90. The closing of the circuit operates the trunk busy relay 102 and supplies a negative 90 volts to the main cathode 116 of the release tube 101 through the trunk busy relay contacts 119 and 120 and lead 111. The release tube 101 is prevented from firing at this time due to condenser 118 and resistor 117 which couple the start anode 114 to the main cathode 116. The negative main cathode voltage passing through this coupling holds the start anode 114 sufficiently negative to avoid firing of the start gap while the negative battery voltage is stabilizing on the trunk and in the filter circuit. From this time until the negative trunk battery voltage is removed, the release circuit will stay in this primed condition, i. e., with the main gap working voltage applied and the start anode 114 too negative to fire the start gap. Removal of the negative battery voltage will cause the start anode 114 to approach ground potential because of resistor 115, thus causing the starter gap to fire. The discharge will transfer from the starter gap to the main gap in accordance with the characteristics of gas triodes. As the voltage across the release tube 101 is between the normal positive potential on the main anode 110 of approximately 6 volts, and the negative 90 volts on the cathode 116, the anode 110 is drawn from its normal positive 6 volts to a voltage in the range of minus 2 to minus 18, the exact value depending upon the sustain voltage of the particular release tube employed. Thus the voltage on the main anode 110, and similarly across the crosspoint relay coil 91 connected to the main anode, reverses. However, as the current through the coil 91 passes through zero, the holding contacts of the crosspoint open, interrupting the holding path and releasing the crosspoint. At the time the crosspoint is thus shunted down, the current through the release 101 also passes through the reset relay in the central office. This relay is slow acting and operates after a delay to remove the negative 90 volts from the main cathode 116 of the release tube. This allows the release tube 101 and the trunk busy relay 102 to return to normal. Having broken its own operating path, the reset relay releases and the complete circuit is again in the idle condition.

The resistance-capacitance filter between the resistance 103 and the leads for the concentrator trunk No. 0 provides a high attenuation to the alternating current simplex voltages on the trunks, while passing the direct current supervisory voltage with little loss. In the absence of these filters full level simplex voltages would appear on the diodes 106 and 107 and drive them back and forth between the conducting and non-conducting states. As the bias potentials on these two diodes are different these transitions would occur at different times, spoil the conjugacy between the signaling and the talking path and permit some of the alternating current simplex signal to spill into the speech circuit. Also the discontinuity in the conduction of the diodes would produce additional harmonics of the simplex signal which would increase its interfering effect since more energy would appear in the speech range.

As long as the peak alternating current voltage at the midpoints between diode 107 and resistor 105, and diode 106 and resistor 104 is less than the direct current voltage difference between either of these points and the anode 114, i. e., the swing is less than the direct current voltage across the diodes and resistor 103, the diodes 106 and 107 will conduct or fail to conduct without interruption from the alternating current simplex voltage over the entire cycle of this signal. Thus, the release circuit behaves in a linear manner, the conjugacy of signaling and talking paths is preserved and no noise is introduced in the speech circuit.

A simplified schematic representation of some of the central office components of the instant novel telephone system is shown in Fig. 4, in which the request busy detector and the reset circuit are disclosed in detail. As previously explained, the number group translator in the remote line concentrator establishes a path from the request busy detector 20 in the central office to one of the individual line circuits in the concentrator. The impedance of each line circuit depends upon the service condition of the line. As the input transformer 126 to the request busy detector 20 appears in series with the alternating current reference voltage source 19, the control leads to the concentrator, the number group translator and the line circuit, the service condition of the line will determine the current appearing in the input winding of the transformer 126. The voltage across resistor 128, connected across the secondary winding of the transformer 126 will then be a small pulse for an idle line, an intermediate size pulse for a line requesting service and a large pulse for a busy line.

The request busy detector 20, described in greater detail in application Serial No. 427,922, filed May 6, 1954, by S. T. Brewer, is connected to the input transformer 126 by two diodes 151 and 129 so poled as to pass only pulses of positive polarity. Diode 151 is connected through a resistor 130 to the grid 135 of a gaseous discharge device 131, which advantageously may be a cold cathode gas tube of the type disclosed in Patent 2,607,021, issued August 12, 1952, to Hans L. von Gugelberg. This gas tube has the desirable characteristic of a very short ionization time, which is obtained by maintaining a continuous keep alive discharge between a small cathode 132 and a large flat cathanode 133, the latter being apertured to permit the transfer of electrons therethrough. The cathanode 133 is held biased with respect to the cathode 132 by means of a potentiometer 134 that is connected between a positive 50 volt potential source and ground. The cathanode 133 is also connected to the grid 135 through a diode 136. The anode 137 of tube 131 is connected to one end of a relay coil 138, the other end of which is connected through transformer 152 to a source of a positive potential of 80 volts. The cathode 132 of the gas tube 131 is connected to a negative 100 volt source by a resistor 140. The diode 129 is similarly connected through a resistor 153 to the grid 154 of a cold cathode gaseous discharge tube 170, which may also be of the type disclosed in Patent 2,607,021. Grid 154 is connected through a diode 171 to a cathanode 141 and to a potentiometer 172 which is connected between ground and a positive 50 volt source of bias potential. The cathode 173 of the gaseous tube 170 is connected through a resistor 139 to a negative 100 volt source. The anode 174 of tube 170 is connected through a resistor 175 to a relay coil 142 which has a resistor 143 in series with a condenser 144 connected thereacross and which is returned to the same potential source as relay coil 138. Contacts 145 of relay coil 138 are connected on one side to a ground and on the other to one electrode of the gaseous diode 146, which advantageously may be a neon lamp. The other electrode of the diode 146 is connected to one side of the contacts 147 of the relay coil 142, the other side of the contacts being connected to ground. The last-named electrode of diode 146 is also connected to a resistor 149 and to one electrode of a gaseous diode 148, which is similar to diode 146. The other electrode of diode 148 is connected through a resistor 150 to a negative 100 volt source, which is also the terminal for the resistor 149.

With regard to the operation of the cold cathode gaseous discharge tube, such as tube 131, there is normally a discharge present between the keep alive cathode 132 and the main cathode 133. In the absence of any signal on the control grid 135, this grid is biased negatively with respect to the main cathode 133 and there is no conduction in the main gap of the tube, i. e., from the main cathode 133 to the main anode 137. If the control grid 135 is made sufficiently positive to overcome the cut-off bias, charge particles from the keep alive gap are injected into the main gap to effect breakdown of the main gap, and the relay 138 in series with this gap will be operated. Thus, it can be seen that the characteristics of the grid controlled cold cathode gaseous tube employed in this illustrative embodiment are similar to those of a thyratron. It should be noted that the voltage for the main anode of tube 131 is furnished by the positive 80 volt source in series with the 65 volt root mean square alternating current voltage from the transformer 152. During the portion of the operating cycle when pulse signals are present on the grid 135, the sum of these two anode voltages is sufficiently high to permit conduction of the main gap of tube 131. During the interval between signal pulses, the 65 volt alternating current signal reverses polarity, and causes the anode voltage to drop sufficiently to extinguish any triggered tube and to restore the detector to the ready state for the next input signal.

The size of the positive pulse required to trigger the gas tubes 131 and 170 into conduction may be regulated by varying the main cathode bias. This is controlled by individually adjusting the potentiometers 134 and 172, respectively, which determine the positive potential on the main cathodes of these tubes. In the case of tube 131, the bias is adjusted so that the tube is not triggered with an idle pulse but will be triggered by a request or busy pulse. In the case of tube 170 the bias is adjusted so that the tube will not be triggered by either an idle or a request pulse but will be triggered by a busy pulse.

Thus an idle pulse at the input transformer 126 will not trigger either tube 131 or tube 170. A request pulse, which is more positive than an idle pulse, will trigger tube 131 but will not be sufficient to overcome the bias of tube 170. A busy pulse has sufficient amplitude to trigger both tube 131 and tube 170. Each time a detector tube is triggered its associated relay operates. The contacts on these relays are arranged to light the request and busy indicators, 146 and 148, respectively. Obviously neither indicator will light on an idle pulse. When a request pulse is present, tube 131 is triggered and operates the relay 138. The contacts 145 of the latter relay close and complete a circuit through the negative 100 volt source and resisor 149 to light indicator tube 146. The drop across resistor 149 is sufficiently small so that the potential across tube 148 prevents the latter from breaking down. If a busy pulse occurs, both tubes 146 and 148 are triggered. In this case, the relays 138 and 142 are operated and close their associated contacts 145 and 147, respectively, to light indicator lamp 148. Request indicator lamp 146 cannot operate as it is shorted by the contacts 147. The combination of resistor 143 and condenser 144 which are connected across the relay coil 142 are provided to cause a delay in the release of relay coil 142. This staggers the release times of the two relays, 138 and 142, to prevent a momentary false request indication.

The diode-resistor input networks for the detector tubes 131 and 170 are used to prevent these tubes from interacting with each other and producing undesirable results. For example, whenever a detector tube is triggered, a large positive pulse appears on its control grid since the control grid acts as a probe in the main gap discharge within the tube. If the input networks were not present, this positive voltage would be fed back onto the grid of the other detector tube via the common input circuit and could cause the latter tube to trigger falsely. The diodes in the input circuit are poled so that the path between the tubes presents a large impedance to these posiive pulses and thus sympathetic triggering of the detector tubes is avoided.

Fig. 4 also shows the reset circuit which comprises a relay coil winding 155 having one end connected to a source of a negative potential of 90 volts and the other end connected to the normally closed contacts 156. The contacts 156 are connected through a resistor 159 to the contacts of the trunk busy relay in the release circuit through lead 160, coil 157, the windings of transformer 158 and the control lead 161. As explained above in relation to the operation of the release circuit, the reset relay normally supplies a negative 90 volts to the main cathode of the release tube and is operated by conduction of the release tube to remove the bias and put out the release tube after the shunt down interval. As the reset relay breaks its own operating path when it is actuated, it quickly releases to return the complete circuit to the idle condition.

Control lead 162 is connected through the input windings of transformer 158 and coil 164 to a positive 24 volt source, which supplies the potential for the trunk busy relay and for the individual subscriber loops. Control lead 163 is connected to a positive 10 volt source through the input transformer 126 of the request busy detector 20. As previously pointed out, this source supplies the bias for the group number group diodes of the line circuits. Transformer 126 is connected to a 60 cycle alternating current signal source 19 and to the simplex signal encoder 17, explained in detail above with reference to Fig. 2.

Thus we have shown and described a specific illustrative embodiment of a novel telephone system which employs alternating current simplex circuits and a reversible number group to transmit control information in both directions between a remote line concentrator and a central office over a single group of conductors. It is to be understood that the above-described arrangements are but illustrative of the application of the principles of this invention. Numerous other arrangements may be made by those skilled in the art without departing from the spirit and the scope of the invention.

What is claimed is:

1. A remote line concentrator telephone system comprising a plurality of telephones, a subscriber line connected to each of said telephones, a central office, a plurality of concentrator trunks extending from said central office, the number of said trunks being less than the number of said lines, a switching network for connecting any of said lines to any of said trunks, said network comprising means defining crosspoints between said lines and said trunks capable of defining conducting paths on application of marking potentials thereto, a plurality of alternating current simplex circuits connected to said trunks, an alternating current encoder connected to said simplex circuits for transmitting coded alternating current signals over said trunks, and control means connected to said simplex circuits for receiving said coded alternating current signals and for applying line test, line marking and trunk marking potentials to said switching network in accordance with said signals.

2. A remote line concentrator in accordance with claim 1 wherein said control means comprises a plurality of gaseous discharge devices which are selectively operated by said alternating current coded signals to test the line service condition of each of said subscriber lines.

3. A remote line concentrator in accordance with claim 1 wherein said control means comprises means for testing the condition of any of said subscriber lines and means for transmitting indications of such conditions back to said central office.

4. A remote line concentrator in accordance with claim 1 wherein said control means comprises a plurality of gaseous discharge devices which may be selectively energized to apply marking potentials to said lines and said trunks to effect desired crosspoint conducting paths.

5. A remote line concentrator telephone system comprising a plurality of telephones, a subscriber line associated with each of said telephones, a central office, a plurality of trunks extending from said central office, switching means defining talking path crosspoints between any one of the subscriber lines and any one of said trunks, alternating current simplex means connected to each of said trunks adjacent said central office and adjacent said switching means, a source of alternating current coded signals connected to said alternating current simplex means adjacent said central office, control means connected to said alternating current simplex means adjacent said switching means, said control means comprising a discharge device for each of said subscriber lines, means for applying alternating current coded signals from said source to said control means selectively to energize the electron discharge devices associated with said lines, whereby the current in each energized electron discharge device is dependent upon the condition of its associated line, and means for detecting the current in said electron discharge devices to indicate the condition of the subscriber lines.

6. In a remote line concentrator telephone system having a plurality of subscriber lines, a central office, a plurality of trunks extending from said central office to a remote switching and control means located adjacent said subscriber lines, alternating current simplex coding means located in said central office and connected to said trunks for transmitting alternating current coded signals to said remote switching and control means, and a two-way number group translator comprising gaseous electron discharge means connected to said alternating current simplex circuits for receiving said alternating current coded signals to test said lines and for transmitting signals indicating the service conditions thereof to said central office.

7. A telephone system comprising a plurality of subscriber lines, a remote line concentrator adjacent said subscriber lines and connected thereto, a central office, a plurality of trunks, fewer in number than said subscriber lines, extending from said central office to said remote line concentrator, and alternating current simplex encoder means connected to said trunks in said central office to transmit coded alternating current signals to said remote line concentrator to control the performance of line testing and marking operations therein.

8. In a remote line concentrator telephone system employing alternating current coded simplex circuits for communicating control and test information signals between a central office and the remote line concentrator, a two-way number group translator comprising a plurality of gaseous discharge devices, one for each line circuit of the concentrator, means to connect each of said devices to the alternating current coded simplex circuits, means to apply potentials from said simplex circuits to said devices in coded combinations so that each combination will cause only one of said devices to operate, means to connect each device with its associated line circuit, and common return means connected to all of said devices whereby the operation of any device by its associated code will test its associated line circuit and cause a signal to be transmitted over said common return means to the central office to indicate the condition of the line.

9. A remote line concentrator connected between a central office and a plurality of subscriber line circuits comprising means to receive coded alternating current signals from the central office, means to translate each of the said coded alternating current signals, means responsive to the translating means to transmit a test signal to the subscriber line circuit associated with the coded alternating current signals, and means connected to the translating means to transmit a signal indicating the service condition of the line circuit being tested back to the central office.

10. In a remote line concentrator connected between a plurality of central office trunks and a plurality of subscriber line circuits having switching means for connecting each of said trunks to any of said line circuits, switch controller means for determining the operation of said switching means comprising simplex means for receiving alternating current coded information signals from said central office trunks and gaseous tube means connected to said simplex means for translating said coded information signals to apply marking potentials to the trunks and line circuits associated with the codes for effecting desired connections in said switching means.

11. A communication system comprising a central office, a plurality of lines, a plurality of trunks extending from said office, there being fewer trunks than lines, and means for testing the condition of said lines, said testing means including alternating current simplex circuits connected to said trunks adjacent said central office and adjacent said lines, means individually connected between said trunks and each of said lines and operable upon reception of a particular coded signal, and means for detecting current through each of said last-mentioned means to indicate the condition of said lines.

References Cited in the file of this patent

UNITED STATES PATENTS 1,572,224 Powell ---------------- Feb. 9, 1926